(12) United States Patent
Seff et al.

(10) Patent No.: US 6,583,081 B2
(45) Date of Patent: Jun. 24, 2003

(54) METHOD OF MANUFACTURE OF MOLECULAR SIEVES

(75) Inventors: Karl Seff, Honolulu, HI (US); Hyun Sook P. Cordes, Lincoln University, PA (US); Martin Bülow, Basking Ridge, NJ (US); Frank R. Fitch, Bedminster, NJ (US); Adeola F. Ojo, Scotch Plains, NJ (US); Sudhakar R. Jale, Scotch Plains, NJ (US); Dongmin Shen, Berkeley Heights, NJ (US)

(73) Assignee: The BOC Group, Inc., Murray Hill, NJ (US)

( * ) Notice: Subject to any disclaimer, the term of this patent is extended or adjusted under 35 U.S.C. 154(b) by 0 days.

(21) Appl. No.: 09/773,441

(22) Filed: Feb. 1, 2001

(65) Prior Publication Data

US 2002/0072468 A1 Jun. 13, 2002

(Under 37 CFR 1.47)

Related U.S. Application Data

(60) Provisional application No. 60/181,517, filed on Feb. 10, 2000.

(51) Int. Cl.$^7$ .............................. B01J 29/06; B01J 29/08
(52) U.S. Cl. .............................. 502/65; 502/64; 502/66; 502/73; 502/74; 502/79
(58) Field of Search .............................. 502/64, 65, 73, 502/66, 74, 79

(56) References Cited

U.S. PATENT DOCUMENTS

| | | | |
|---|---|---|---|
| 2,882,243 A | 4/1959 | Milton | |
| 2,882,244 A | 4/1959 | Milton | |
| 3,216,789 A | 11/1965 | Breck et al. | |
| 4,859,217 A | 8/1989 | Chao | |
| 4,925,460 A | 5/1990 | Coe et al. | |
| 5,179,979 A | 1/1993 | Zollinger | |
| 5,413,625 A | 5/1995 | Chao et al. | |
| 5,417,957 A | 5/1995 | Coe et al. | |
| 5,419,891 A | 5/1995 | Coe et al. | |
| 5,464,467 A | 11/1995 | Fitch et al. | |
| 5,616,170 A | 4/1997 | Ojo et al. | |
| 5,916,836 A | 6/1999 | Toufar et al. | |
| 5,932,509 A | 8/1999 | Balse et al. | |
| 6,053,966 A | * 4/2000 | Moreau et al. | 502/79 |
| 6,087,289 A | * 7/2000 | Choudary et al. | 502/62 |
| 6,407,025 B1 | * 6/2002 | Brandt et al. | 502/64 |

FOREIGN PATENT DOCUMENTS

| | | |
|---|---|---|
| EP | 0 685 429 A2 | 12/1995 |
| EP | 0 685 430 A2 | 12/1995 |
| EP | 0 729 782 B1 | 9/1996 |
| EP | 0 850 877 | * 7/1998 |
| EP | 1 046 422 A2 | 10/2000 |
| GB | 1 580 928 | 12/1980 |

OTHER PUBLICATIONS

L.B. Sand:, "Synthesis of Large–Port and Small–Port Mordenites," Molecular Sieves, Society of Chemistry and Industry, London (1968), pp. 71–76.

Editors Van Bekkum et al., Introduction To Zeolite Science and Practice: *Studies in Surface Science and Catalysis*, vol. 58, 1991; R. P. Townsend, "Ion Exchange in Zeolites," Chapter 10, pp. 359–390.

Donald W. Breck, Zeolite Molecular Sieves:*Structure, Chemistry, and Use*; Krieger Publishing Co., 1974, Chapter 7, pp. 529–592.

Donald W. Breck, Zeolite Molecular Sieves:*Structure, Chemistry, and Use*; Krieger Publishing Co., 1974, Chapter 8, pp. 593–724.

* cited by examiner

*Primary Examiner*—Tom Dunn
*Assistant Examiner*—Christina Ildebrando
(74) *Attorney, Agent, or Firm*—Philip H. Von Neida; Salvatore P. Pace

(57) ABSTRACT

Zeolites exchanged with lithium, rubidium, cesium cations and trivalent cations are prepared by first partially, fully or excessively ion-exchanging a sodium-containing zeolite, a potassium-containing zeolite or a sodium- and potassium-containing zeolite with trivalent cations, then calcining the partially, fully or excessively trivalent cation-exchanged zeolite, and then ion exchanging the calcined zeolite with lithium rubidium, cesium cations, thereby replacing hydrogen and any sodium and/or potassium cations remaining in the zeolite with lithium, rubidium, cesium cations, whereby trivalent cations present in the zeolite will not be substantially replaced by the lithium ions.

17 Claims, No Drawings

METHOD OF MANUFACTURE OF MOLECULAR SIEVES

FIELD OF THE INVENTION

The present invention relates to a method of producing a molecular sieve containing sodium, lithium, rubidium, cesium, magnesium, calcium, strontium, silver and/or first row transition metal cations and partially or completely hydrolyzed trivalent metal cations, and more particularly to a method of producing a material containing a "continuum" of trivalent metal oxide by contacting zeolites with appropriate sources of trivalent cations and sodium, lithium, rubidium, cesium, magnesium, calcium, strontium, silver and/or first row transition metal cations. Specifically, the invention relates to the preparation of lithium ion-exchanged faujasite type zeolites containing a "continuum" of trivalent metal oxide.

BACKGROUND OF THE INVENTION

Many industrially utilized zeolites are most economically synthesized in their sodium, potassium or mixed sodium-potassium cation forms. For example zeolites A, (U.S. Pat. No. 2,882,243), X (U.S. Pat. No. 2,882,244) and mordenite (L. B. Sand: "Molecular Sieves", Society of Chemistry and Industry, London (1968), pages 71–76) are usually synthesized in their sodium forms, whereas zeolites LSX, i. e., zeolite X in which the framework silicon-to-aluminum atomic ratio is approximately 1, (UK 1,580,928) and zeolite L (U.S. Pat. No. 3,216,789) are usually synthesized in their mixed sodium and potassium forms. Zeolite L may also be readily synthesized in its pure potassium form.

Although these zeolites have useful properties in the as-synthesized form, it is often preferred to ion-exchange them to further enhance their adsorption and/or catalytic properties. This topic is discussed at length in chapter 8 of the comprehensive treatise of Breck (D. W. Breck: "Zeolite Molecular Sieves", Pub. Wiley, New York, 1973). Conventional ion-exchange of zeolites is carried out by contacting the zeolite, in either powdered or agglomerated form, using batch-wise or continuous processes, with aqueous solutions of salts of the cations to be introduced. These procedures are described in detail in Chapter 7 of Breck and have been reviewed more recently by Townsend (R. P. Townsend: "Ion Exchange in Zeolites", in Studies in Surface Science and Catalysis, Elsevier (Amsterdam) (1991), Vol. 58, "Introduction to Zeolite Science and Practice", pages 359–390).

Conventional exchange procedures may be used economically to prepare many single and/or mixed cation exchanged zeolites. However, in the cases of lithium, rubidium and/or cesium exchange of sodium, potassium, or sodium-potassium zeolites, the original cations are strongly preferred by the zeolite; consequently, large excesses of expensive salts of the lithium, rubidium and/or cesium cations are needed to effect moderate or high levels of exchange of the original cations. Thus, these particular ion-exchanged forms are considerably more expensive to manufacture than typical adsorbent grades of zeolites. Furthermore, to minimize the cost of the final form of the zeolite, and to prevent discharge of these excess ions to the environment, considerable effort must be made to recover the excess ions from the residual exchange solutions and from washings in which the excess ions remain mixed with the original ions that were exchanged out of the zeolite. Since lithium-containing zeolites have great practical utility as high performance adsorbents for use in the noncryogenic production of oxygen, and rubidium and cesium exchanged zeolites have useful properties for the adsorptive separation of the isomers of aromatic compounds and as catalysts, this problem is of significant commercial interest.

U.S. Pat. No. 4,859,217 discloses that zeolite X (preferably having a framework silicon-to-aluminum atomic ratio of 1 to 1.25), in which more than 88% of the original sodium ions have been replaced by lithium ions, has very good properties for the adsorptive separation of nitrogen from oxygen. In the preparation of the zeolite, the base sodium or sodium-potassium form of the X zeolite was exchanged by conventional ion-exchange procedures, using 4 to 12 fold stoichiometric excess of lithium salts.

Additionally, a wide range of other lithium-containing zeolites allegedly exhibit advantageous nitrogen adsorption properties. For example, U.S. Pat. Nos. 5,179,979, 5,413,625 and 5,152,813 describe binary lithium- and alkaline earth-exchanged X zeolites; U.S. Pat. Nos. 5,258,058, 5,417,957 and 5,419,891 describe binary lithium- and other divalent ion-exchanged forms of X zeolite; U.S. Pat. No. 5,464,467 describes binary lithium- and trivalent ion-exchanged forms of zeolite X; EPA 0685429 and EPA 0685430 describe lithium-containing zeolite EMT; and U.S. Pat. No. 4,925,460 describes lithium-containing chabazite. In each case conventional ion-exchange procedures are contemplated, involving significant excesses of lithium cations over the stoichiometric quantity required to replace the original sodium and/or potassium cations in the zeolite. In the case of the binary lithium-exchanged zeolites, it may sometimes be possible to slightly reduce the quantity of lithium salt used by carrying out the exchange with the second cation before the lithium ion-exchange step (U.S. Pat. No. 5,464,467) or by carrying out both exchanges simultaneously (EPA 0729782), but in either case a large excess of lithium cations is still needed to achieve the desired degree of exchange of the remaining sodium and potassium cations.

U.S. Pat. No. 5,916,836, issued to Toufar et al., discloses a method of preparing lithium-exchanged or polyvalent cation- and lithium-exchanged molecular sieves from molecular sieves that originally contain sodium ions, potassium ions or both sodium and potassium ions without requiring the use of a large excess of lithium ions. The method of Toufar et al. includes the step of exchanging the original zeolite with a source of ammonium ions prior to the lithium ion-exchange. The initial molecular sieve may contain polyvalent cations in addition to sodium and/or potassium ions, or polyvalent cations may be introduced at any stage of the process.

This invention presents an efficient method of preparing zeolites with enhanced adsorption and catalytic properties, containing sodium, lithium, rubidium, cesium, magnesium, calcium, strontium, silver and/or first row transition metal cations, and partially or completely hydrolyzed trivalent metal cations. A principal advantage of the process of this invention is that it enables the preparation of these zeolites without using large excess of lithium, rubidium, cesium, magnesium, calcium, strontium, silver and/or first row transition metal ion sources.

SUMMARY OF THE INVENTION

According to a broad embodiment, the invention comprises a method of producing a cation-exchanged zeolite comprising the steps:

(a) contacting at least one synthetic zeolite selected from the group consisting of structure types FAU, EMT, LTA, CHA, MOR, OFF, ERI, zeolite ZK-5, BEA and GME and combinations thereof and containing sodium ions, potassium ions or mixtures thereof with a source of trivalent cations, thereby replacing most of the sodium ions, potassium ions or mixtures thereof with trivalent cations and producing a substantially trivalent cation-exchanged zeolite;

(b) calcining the substantially trivalent cation-exchanged zeolite at a temperature in the range of about 200 to about 650° C., thereby generating protons in said zeolite; and (c) contacting the calcined zeolite with a source of sodium, lithium, rubidium, cesium, magnesium, calcium, strontium, silver and/or first row transition metal hydroxides or mixtures thereof, or precursors thereof, thereby replacing protons and at least some of the initial cations remaining on the zeolite with sodium, lithium, rubidium, cesium, magnesium, calcium, strontium, silver and/or first row transition metal cations, or mixtures thereof.

In a preferred embodiment of the invention, the at least one synthetic zeolite contains sodium ions. In this preferred embodiment, the at least one synthetic zeolite preferably comprises type A zeolite, type X zeolite, type EMC-2 zeolite, mixtures of two or more of type A zeolite, type X zeolite, or type EMC-2 zeolite or intergrowths of two or more of type A zeolite, type X zeolite, or type EMC-2 zeolite. In a more preferred embodiment, the at least one synthetic zeolite comprises type X zeolite, and in a still more preferred embodiment, the at least one synthetic zeolite comprises type X zeolite having a framework silicon-to-aluminum atomic ratio of 0.9 to 1.1.

In another preferred embodiment of the invention, the trivalent cations comprise aluminum, gallium, iron, chromium, indium, single rare earth ions, mixtures of two or more rare earth ions, or mixtures thereof.

In a more preferred embodiment, the trivalent cations comprise at least one rare earth ion. In another preferred embodiment, rare earth cations comprise about 50 to about 150%, on an equivalents basis, of the total exchangeable cations on the zeolite. In this more preferred embodiment, step (b) of the broad embodiment is preferably carried out at a temperature in the range of about 250 to about 550° C. In a still more preferred embodiment, the at least one rare earth ion comprises about 50 to about 100%, on an equivalents basis, of the total exchangeable cations on the zeolite.

In another preferred embodiment of the invention, the calcined zeolite is contacted with a source of lithium ions in step (c). Preferably, in this embodiment the lithium ions are in the form of lithium hydroxide or a precursor thereof, and more preferably, the reaction zone is an aqueous medium. In a preferred aspect of this preferred embodiment, step (c), is carried out at a temperature in the range of about 0 to about 100° C. In another preferred aspect of this preferred embodiment, the lithium ion exchange step is carried out at a pH value greater than about 10.

In another preferred embodiment, the at least one synthetic zeolite initially contains sodium ions, and the method further comprising, prior to step (b), the additional step of contacting the at least one synthetic zeolite with a water-soluble potassium salt. This step may be carried out prior to step (a), or it may be carried out between steps (a) and (b).

In another preferred embodiment of the invention, the calcined zeolite is contacted with a source of lithium ions in step (c). Preferably, in this embodiment the lithium ions are in the form of lithium hydroxide or a precursor thereof. Alternatively, the reaction may be carried out by means of solid-state exchange at a temperature in the range of about 100 to about 550° C.

In another preferred embodiment of the invention, the zeolite contains sodium ions and further comprises between steps (b) and (c) the additional step of contacting the calcined zeolite with a water soluble potassium salt.

DETAILED DESCRIPTION OF THE INVENTION

The invention describes a reproducible multi-step method of preparing mixed cation faujasite-type zeolites, involving replacing at least some of the exchangeable cations initially on the zeolite with trivalent cations, then calcining the trivalent cation-exchanged zeolite to generate protons, and then replacing most of the protons and some or all of the remaining initial cations on the zeolite with lithium, rubidium and/or cesium ions.

The base zeolite treated according to the process of the invention is any synthetic zeolite that has a framework silicon-to-aluminium atomic ratio in the range of about 0.95 to about 5. Preferably the zeolite has a framework silicon-to-aluminum atomic ratio in the range of about 0.95 to about 2, and most preferably, this ratio is in the range of about 0.95 to about 1.10. Suitable synthetic zeolites for use in practice of the invention include zeolite X, zeolite Y, chabazite, zeolite A, EMT (particularly EMC-2), offretite, erionite, ZK-5, beta, mordenite, and gmelinite. Synthetic zeolites that are preferred for use in the process of the invention include zeolite X, low silicon zeolite X (LSX) having a framework silicon-to-aluminum atomic ratio in the range of about 0.95 to about 1.05, and zeolite Y.

The first ion exchange step, i.e., the trivalent cation exchange step, is generally carried out before any other cation exchange step of the process. Trivalent cations introduced into the zeolite during this step include aluminum, gallium, iron (III), i.e., ferric ion, chromium (III), i.e., chromic ion, indium, and cations of the rare earth elements. The rare earth ions include scandium, yttrium, lanthanum, cerium, praseodymium, neodymium, promethium, samarium, europium, gadolinium, terbium, dysprosium, holmium, erbium, thulium, ytterbium, and lutetium cations. Mixtures of any two or more of the above trivalent cations can also be introduced into the zeolite in this step. Preferred trivalent cations include mixtures of rare earth cations, particularly commercially available rare earth mixtures, such as those in which the combined concentrations of lanthanum, cerium, praseodymium and neodymium totals at least about 40%, and preferably at least about 75% of the total number of rare earth cations in the mixtures. The most preferred rare earth mixtures contain cerium-depleted commercial mixtures of rare earths. Other preferred trivalent ions include those of the less common rare earth elements, ferric iron, and chromic chromium, aluminum, and gallium, and mixtures thereof.

The trivalent cation ion-exchange step is carried out until the desired degree of trivalent cation exchange, viz., in the range of about 50 to about 150%, on an equivalents basis is achieved. Complete ion-exchange is undefined for this system because this process includes not only the uptake of trivalent cations per se but also hydrolyzed or oxidized forms of trivalent cations. For example, in the case of rare earth cation-exchange, hydrolyzed and oxidized forms of $RE^{3+}$, such as: $RE(OH)_3$, $RE(OH)_2^+$, $RE(OH)^{2+}$, $RE_2O_3$, etc., may occur. As above, RE here stands for any rare earth metal, including scandium, yttrium and lanthanum. The extent of uptake depends on factors such as the temperature and pH value of the system, Si/Al ratio of the zeolite being ion-exchanged, etc. Incomplete or over-exchange are as likely to occur as stoichiometrically complete exchange.

The optimum degree of trivalent cation ion-exchange depends upon the particular application for which the zeolite is intended. In some cases, less-than-stoichiometric level of exchange is preferred, while for other applications stoichiometric or greater-than-stoichiometric level of exchange is preferred. It may be enough to fill all or most sodalite units with clusters, such as of $La_4(O$ or $OH)_4$ which may lead, upon dehydration of the ion-exchanged material, to an oxidic "continuum" of a trivalent metal, throughout the entire system of small cages, i.e., sodalite cages and those in the hexagonal prisms of the FAU structure. In conjunction with the formation of a "continuum"-like $RE_2O_3$ phase, protons are generated within the zeolite in order to neutralize negative charges on the framework. This material may be in itself useful as a sorbent, in its proton form, or these protons may be titrated with NaOH, LiOH, $Ca(OH)_2$, etc., or with mixtures of these or their precursors, to give cationic forms, e.g., $Na^+$, $Li^+$, $Ca^{2+}$, forms, etc., or mixtures of these forms. Most advantageously, these charge-balancing protons are exchanged with sodium, lithium, rubidium, cesium, silver and/or calcium ions. The zeolite does not necessarily need to be fully exchanged with the desired sodium, lithium, rubidium, cesium, magnesium, calcium, strontium, silver and/or first row transition metal cations, in particular, dipositive first row transition metal cations like manganese. Less than full exchange may be even more advantageous for some applications of the zeolites made by this invention.

The trivalent cation ion-exchange can be carried out by any of the well-known zeolite cation exchange techniques, the particular procedure followed not being critical to the method of the invention. For example, this ion-exchange step may be carried out in a single aqueous exchange step utilizing an excess amount of the trivalent ion(s) as solutions of suitable soluble salts in water (preferably acetates) either in a stirred tank containing the zeolite powder, or in a column using pellets of the zeolite (prepared by known techniques). According to one particularly suitable procedure, the initial zeolite in powder form is suspended in an aqueous liquid, e.g., water, and an aqueous solution of the desired trivalent cation salt or salts, e.g., a rare earth acetate mixture, is added thereto while maintaining the mixture in suspension at a temperature in the range of about 0 to about 80° C., for example, at ambient temperature. This procedure is repeated, if necessary, until the desired degree of cation exchange is achieved, which usually occurs in about 1 to about 10 hours. The trivalent cation ion-exchanged zeolite is then recovered from the suspension, preferably by filtration and washing of the filter cake with distilled water, thereby producing the desired cation-exchanged intermediate product.

The second step of the method of the invention comprises calcination of the trivalent cation ion-exchanged zeolite to generate a "continuum" of RE oxide. This calcination step may be subsequent to or accompanied by application of vacuum or use of a purge with inert gas. This precaution is preferably taken to avoid a possible damage of the zeolite structure under hydrothermal conditions. The duration of the calcination step is not critical, however, it is carried out for a period of time sufficient to produce the desired result. In carrying out the calcination step, the trivalent cation-exchanged zeolite is heated to and maintained at a temperature generally in the range of about 200 to about 650° C., and, preferably, in the range of about 250 to about 550° C., under conditions in which hydrothermal damage to the zeolite is minimized.

The reason for the beneficial effect of the calcination step is not known with certainty, but it is believed that calcining the trivalent cation-containing zeolite at this stage of the process creates a material with a "continuum" (as the limiting state for full exchange) of trivalent metal oxide within the small cages of the zeolites, e.g., within the sodalite units and/or hexagonal prisms of faujasite or within the small cages of other zeolites, i.e., zeolite structures other than faujasite that have both small cages and supercages. This effect leaves the supercages of the zeolite substantially free of trivalent cations, so that during the lithium, rubidium, cesium, magnesium, calcium, strontium, silver and/or first row transition metal cations, in particular, dipositive first row transition metal cations like manganese, cation exchange, the lithium, rubidium, cesium, magnesium, calcium, strontium, silver and/or first row transition metal cations, in particular, dipositive first row transition metal cations like manganese, cations have only to replace/ exchange protons and sodium and/or potassium ions positioned in the supercages. As a result, lesser amounts of expensive lithium, rubidium and/or cesium ion sources are required to effect the desired degree of exchange of both the trivalent cations and the lithium, rubidium and/or cesium ions than in any of the conventional procedures, and the adsorption and/or catalytic properties of the resulting ion-exchanged materials appear to be enhanced.

A second advantage of the calcination step is that it permits the process to be successfully carried out with fewer industrial scale manufacturing steps than are required when preparing the desired zeolites by conventional procedures. For example, in the process of this invention, it is not necessary to include the ammonium ion exchange step of the method disclosed in the patent granted to Toufar et al. prior to the lithium ion exchange, in order to attain efficient and economic cation exchange of the latter cation(s).

In the final required step of the invention, the calcined trivalent cation ion-exchanged zeolite is contacted with a compound or solution of the sodium, lithium, rubidium, cesium, magnesium, calcium, strontium, silver and/or first row transition metal cations, in particular, dipositive first row transition metal cations like manganese ions, and most preferably with a lithium compound or solution. This ion-exchange step can be carried out in any of various ways, for example, it can be carried out in an aqueous environment in a stirred vessel, with a source of lithium, rubidium and/or cesium ions being added continuously or in one or more slugs, or it can be carried out by passing a lithium, rubidium and/or cesium ion-containing solution over the agglomerated form of the calcined trivalent cation-exchanged zeolite in a column. The preferred source of the lithium, rubidium and/or cesium ion(s) is the hydroxide or a precursor thereof, i.e., the oxide or the pure metal, if it reacts with water to form the hydroxide. Alternatively, the source of these cations can be any salt of the cation, such as lithium chloride, rubidium chloride and/ or cesium chloride, but preferably a salt of the cation(s) the aqueous solution of which has a pH value higher than about 10.

In the liquid phase, the lithium, rubidium and/or cesium ion-exchange reaction can be carried out at any temperature, however, the rate of the reaction is increased substantially if elevated temperatures, preferably temperatures of 50° C. or higher, are applied. The amount of lithium, rubidium and/or cesium ion necessary for the final ion-exchange step is generally at, or slightly above, the stoichiometric amount needed to effect the desired degree of ion exchange of lithium, rubidium and/or cesium ions. Any excess of these cations is generally well below 10% of the stoichiometric amount, and the excess lithium, rubidium and/or cesium is not wasted, since the cation exchange solution can be at least partially reused for the exchange of subsequent batches when mixed with fresh lithium, rubidium and/or cesium hydroxide or other compound.

As an alternative procedure, the lithium rubidium and/or cesium ion-exchange step can be done without the presence of water where the source of the cation(s) can be the hydroxide, the oxide or any salt of the cation where the anion of this salt forms a volatile compound. In such a case, the ingredients are mixed mechanically and then heated up to temperatures at which the reaction product is volatile. If the hydroxide and/or the oxide is the source of the cation(s), the reaction can be done at ambient temperature or at an even lower temperature, and only a mechanical activation is necessary to complete the reaction.

The ion-exchanged product may be in the powdered form or it may be agglomerated and shaped into particles, e.g., extruded pellets. Agglomeration may be carried out before or after the lithium, rubidium and/or cesium ion exchange step. Any crystalline or amorphous binder or combination of binders suitable for use with the ion-exchange material can be used as an agglomerant, and any method of agglomeration can be employed. Typical binders and methods of agglomeration are disclosed in U.S. Pat. Nos. 5,464,467, 5,616,170 and 5,932,509 the disclosures of which are incorporated herein by reference.

The zeolites produced by the process of this invention are useful in a wide range of gas separation and purification applications, including, but not limited to, the separation of nitrogen from mixtures of nitrogen with other atmospheric gases, the separation of olefins from paraffins with the same number of carbon atoms in their skeletons, and the separation of carbon dioxide from air.

Although the invention has been described with particular reference to specific embodiments, these embodiments are merely exemplary of the invention and variations are contemplated. The scope of the invention is limited only by the breadth of the appended claims.

What is claimed is:

1. A method of producing a material comprising the steps:
   (a) contacting at least one synthetic zeolite selected from the group consisting of structure types FAU, EMT, LTA, CHA, MOR, OFF, ERI, zeolite ZK-5, BEA, GME and combinations thereof and containing sodium ions, potassium ions or mixtures thereof with a source of trivalent cations, thereby replacing most of the sodium ions, potassium ions or mixtures thereof with trivalent cations and producing trivalent cation-exchanged zeolite;
   (b) calcining the trivalent cation-exchanged zeolite at a temperature in the range of about 200 to about 650° C.; thereby generating protons as exchangeable cations, then contacting the calcined zeolite with a water-soluble potassium salt; and
   (c) contacting the calcined zeolite with a source of sodium, lithium, rubidium, cesium, magnesium, calcium, strontium, silver and/or first row transition metal cations or mixtures thereof in a reaction zone, thereby replacing protons and at least some of the initial cations remaining on the zeolite with sodium, lithium, rubidium, cesium, magnesium, calcium, strontium, silver and/or first row transition metal cations, or mixtures thereof.

2. The method of claim 1, wherein said at least one synthetic zeolite contains sodium ions.

3. The method of claim 2, wherein said at least one synthetic zeolite comprises type A zeolite, type X zeolite, type EMC-2 zeolite, mixtures of two or more of type A zeolite, type X zeolite, or type EMC-2 zeolite or intergrowths of two or more of type A zeolite, type X zeolite, or type EMC-2 zeolite.

4. The method of claim 3, wherein said at least one synthetic zeolite comprises type X zeolite.

5. The method of claim 4, wherein said type X zeolite has a framework silicon-to-aluminum atomic ratio of 0.9 to 1.1.

6. The method of claim 1, wherein said trivalent cations comprise aluminum, gallium, iron, chromium, indium, single rare earth ions, mixtures of two or more rare earth ions, or mixtures thereof.

7. The method of claim 6, wherein said trivalent cations comprise at least one rare earth ion, and it comprises about 50 to about 150%, on an equivalents basis, of the exchangeable cations on said zeolite.

8. The method of claim 7, wherein step (b) is carried out at a temperature in the range of about 250 to about 550° C.

9. The method of claim 8, wherein said at least one rare earth ion comprises about 50 to about 100%, on an equivalents basis, of said exchangeable cations on said zeolite.

10. The method of claim 1, wherein in step (c) said calcined zeolite is contacted with a source of lithium ions.

11. The method of claim 10, wherein said lithium ions are in the form of lithium hydroxide or a precursor thereof.

12. The method of claim 11, wherein step (c) is carried out in an aqueous medium.

13. The method of claim 12 wherein step (c) is carried out at a temperature in the range of about 0 to about 100° C.

14. The method of claim 13, wherein step (c) is carried out at a pH value greater than about 10.

15. The method of claim 14, wherein step (c) is carried out at an absolute pressure not greater than about one bar.

16. The method of claim 12, wherein step (c) is carried out at an absolute pressure not greater than about one bar.

17. The method of claim 11, wherein step (c) comprises a solid-state reaction.

* * * * *